Nov. 14, 1933.  B. F. KUBAUGH  1,935,270
COOLING APPARATUS
Filed Jan. 4, 1933   2 Sheets-Sheet 1

Inventor
BENJAMIN F. KUBAUGH
By Mason Fenwick & Lawrence
Attorneys

Nov. 14, 1933.  B. F. KUBAUGH  1,935,270
COOLING APPARATUS
Filed Jan. 4, 1933  2 Sheets-Sheet 2
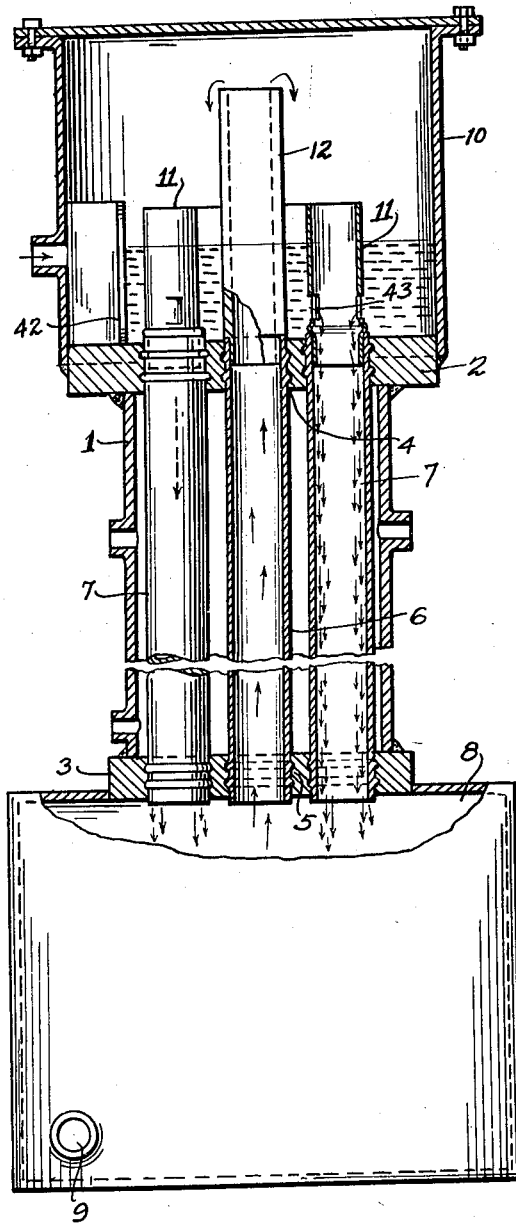
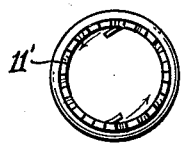
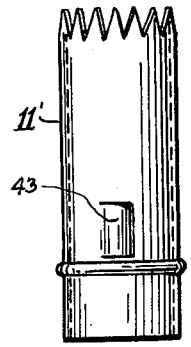
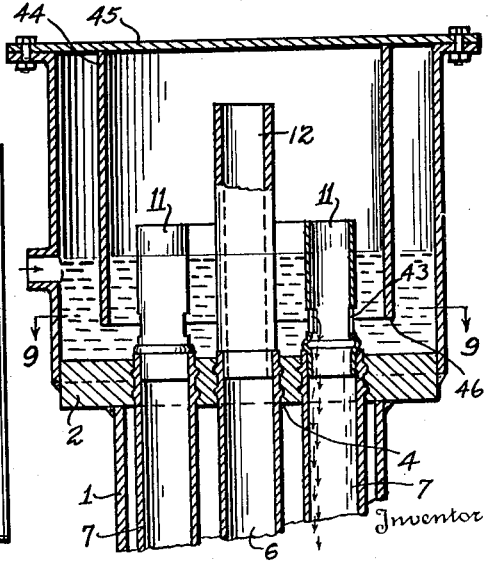
Benjamin F. Kubaugh Patented Nov. 14, 1933

1,935,270

UNITED STATES PATENT OFFICE 1,935,270

COOLING APPARATUS

Benjamin F. Kubaugh, Louisville, Ky., assignor to Henry Vogt Machine Co., Louisville, Ky., a corporation of Kentucky Application January 4, 1933. Serial No. 650,168

5 Claims. (Cl. 62—141)

This invention relates generally to devices for cooling liquids, and is particularly directed to the cooling of liquids under vertical gravity flow.

In the prior art it is customary to cool liquids by allowing the liquids to flow over a series of vertically super-imposed trays or coils having some cooling medium, such as liquid ammonia, circulating therethrough. In this old type cooler, the water, or other liquid to be cooled, enters the top tray at one end and flows over the coils to the opposite end, from which it flows in the same manner successively to and across the trays below.

The object of the present invention is to provide a vertical type liquid cooling tower in which the trays are eliminated, and in which the water or other liquid being cooled, flows by gravity vertically downward through a series of cooling tubes so that heat transfer occurs very rapidly, and as a result a less surface of cooling contact area per ton of cooling effect is required in other type coolers.

Another object of the invention is to provide a liquid cooling apparatus which occupies much less space for its capacity than any coolers of the prior type.

The cooling apparatus forming the subject matter of this application is particularly adapted for the cooling of milk in pasteurizing tanks. The velocity of flow of cooled liquid and the rate of cooling in this apparatus, is so great that the cold liquid outlet can be readily connected to the cooling coils commonly used in milk pasteurizing and cooling containers. As well known in the dairy art, these containers are used first to pasteurize the milk by passing steam through coils immersed in the milk. After pasteurization, it is usual to substitute another set of coils for the heating coils, and to pass cold brine through the substituted coils for the purpose of cooling the pasteurized milk. It has been found impracticable to use the same coil for the reception of both steam and brine in these pasteurizing containers, because brine when used in the same coil after steam causes corrosion of the coil.

It is a particular object of the present invention to provide a cooling apparatus in which the rate of cooling is so high and the velocity of cooled liquid so great that ordinary "sweet water" can be substituted for brine, so that a single coil can be used in pasteurizing tanks both for heating and cooling purposes. For example, a single coil of the well known "Lo-Vat" pasteurizing cooling tanks can be connected first to a source of steam for pasteurizing milk, then the same coil can be afterward connected up to the water outlet of the water cooler disclosed herein so that sweet water from the cooler can be passed through the same Lo-Vat coil to produce the same cooling effect as brine heretofore used. The use of the cooler in this connection effects a great saving in time ordinarily consumed in changing the coils of the pasteurizing tanks from a coil adapted for the use of steam to another coil capable of being used only with brine.

Where the cooling apparatus embodying the present invention is used for cooling milk after pasteurization in a pasteurizing tank, it is intended that the cooling liquid shall be such as cannot effect corrosion in the coils of the pasteurizing tanks after previous use of a heating medium to effect pasteurization. Preferably this liquid is what is known as "sweet water"; that is, water from a city main, and not brine. Of course, any other liquid can be used which will not cause corrosion, or will have no harmful effect, in the previously steam heated coils of the pasteurizing apparatus.

While this cooling apparatus, when connected to a pasteurizing tank for the purpose of cooling milk, will preferably be used to cool sweet water for passage through the cooling coils of said tank, it is obvious that it may be used independently to cool beer, milk or any other liquid by passing such liquid directly through the tubes of the cooling apparatus.

A further object of the invention is to provide apparatus of this character in which the several parts can be detached from the body of the apparatus for the purpose of inspection or cleaning without stopping the cooling operation.

Other objects of the invention will become apparent as the detailed description thereof proceeds.

In the drawings:

Figure 5 is a central vertical section to an enlarged scale through the main body of the cooling apparatus illustrated in Figure 1;

Figure 6 is a side elevation of a modified form of liquid distributing ferrule forming part of this invention;

Figure 7 is a plan of the ferrule shown in Figure 6;

Figure 8 is a fragmentary central vertical section through a modified form of the upper end of the cooling shell illustrated in Figure 5.

Figure 3:
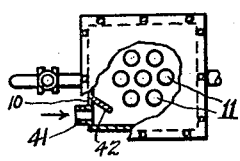
Figure 3 is a top plan view of the upper end of part of the cooling mechanism, parts being broken away and shown in section to illustrate details of construction.
Figure 4:
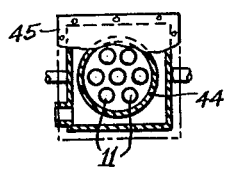
Figure 4 is a view similar to Figure 3, but showing a modified form of the invention.
Figure 1:
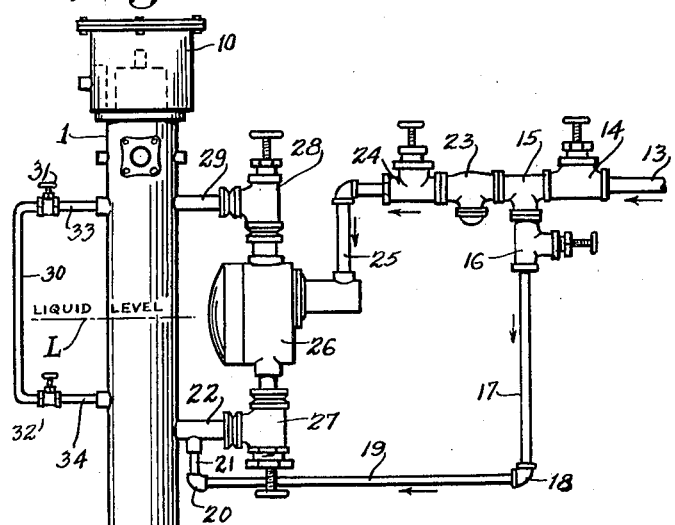
Figure 1 is a front elevation of a cooling unit embodying the present invention.
Figure 2:
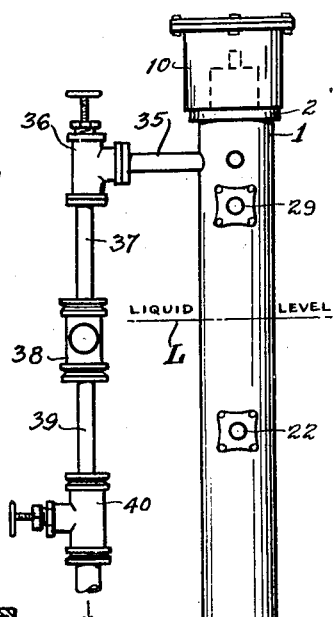
Figure 2 is a side elevation of the apparatus shown in Figure 1.
Figure 9:
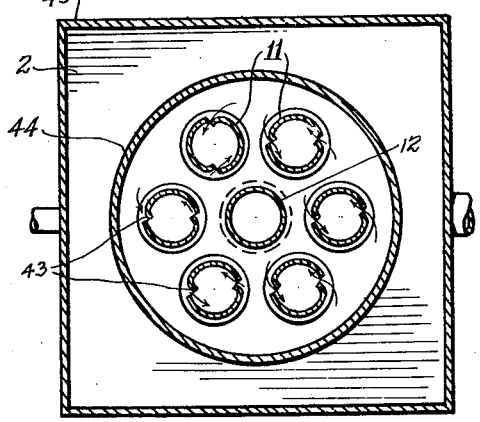
Figure 9 is a horizontal section taken on the line 9—9 of Figure 8.

As shown in Figures 1, 2 and 5 of the drawings, the invention comprises a vertical shell 1 having headers 2 and 3 suitably secured to opposite ends thereof. The shell 1 is preferably cylindrical and the headers are provided at their center with axially aligned apertures 4 and 5, respectively, adapted to receive the opposite ends of an air tube or flue 6. The headers 2 and 3 are also provided with a plurality of apertures concentrically arranged around the axis of the tube 6 to receive a plurality of tubes 7 through which the cooling liquid is intended to fall in order to have heat extracted therefrom by a cooling medium, such as liquid ammonia interposed in the space between the shell 1 and the outer surfaces of the tubes 6 and 7. These tubes 6 and 7 may be secured to the headers 2 and 3 in any suitable manner, but must be secured so as to form a gas-tight joint in order to prevent any leakage of gas which might be generated by exchange of heat between the cooling medium and the liquid cooled.

An outlet chamber 8 is suitably secured to the lower header 3 and is provided with an outlet 9 for the liquid cooled by its passage through the tubes 7. This outlet 9 is adapted to be connected to the coil of a milk pasteurizing and cooling apparatus of the type referred to above, or may be connected to any form of dispensing apparatus for liquids intended to be dispensed in cooled condition.

The upper header 2 has an inlet chamber 10 suitably secured thereto and the upper ends of the tubes 7 are provided with ferrules 11 extending upwardly in the said chamber any suitable distance. The center tube 6 has a ferrule 12 of greater length than the ferrules 11 so that its upper end extends a considerable distance above the top edges of the ferrules 11. The center tube 6 and the ferrule 12 form an air chimney or flue. This flue is for the purpose of recirculating air from the bottom to the top of the vertical shell. It will be obvious that water passing downwardly through the ferrules 11 and tubes 7 will draw or siphon air through these tubes from the chamber 10 to the chamber 8. If the flue were omitted, considerable fresh air would be continuously siphoned downwardly through the tubes; and the constant cooling of this fresh air would impose an additional and useless load upon the cooler. Since the primary object of the invention is to cool water or other liquid and not air, the air flue is provided to permit the recirculation of the same air through the cooling apparatus.

The shell 1 is provided with an ammonia-liquid inlet pipe 13 connected, through a stop valve 14 and a T-fitting 15, to a valve 16 which is connected by a down pipe 17, elbow 18, horizontal pipe 19, elbow 20 and pipe 21 to a pipe 22 connected directly to the shell 1. The T-fitting 15 is connected to one side of the strainer 23, the other side of which is connected to a stop valve 24, which in turn is connected by piping 25 to a float controlled liquid ammonia valve 26 of a well known type. The lower end of the float valve 26 is connected by a valve 27 to the pipe 22; and the upper end of the float valve 26 is connected by a stop valve 28 to a pipe 29 which in turn is directly connected to the shell 1 above the liquid level L of ammonia liquid as maintained in the shell 1 by the float controlled valve 26.

A gauge glass 30 is connected through stop valves 31 and 32 at its upper end to pipes 33 and 34, respectively, which are connected to the shell 1 on opposite sides of the liquid level L. This gauge glass, of course, is intended to indicate the level of ammonia liquid in the shell 1, and obviously may be disconnected from the shell by means of the stop valves 31 and 32.

A pipe 35 is connected to the upper end of the shell 1 to serve as an outlet for the ammonia gas generated by the exchange of heat between the liquid ammonia and the liquid being cooled by its passage through the tubes 7. The outer end of the pipe 35 is connected by a stop valve 36 to a vertical pipe 37 having its lower end connected to a back pressure valve 38. The lower end of the back pressure valve 38 is connected by a pipe 39 to a stop valve 40 which controls the flow of ammonia gas to any low side refrigeration apparatus for converting it to an anhydrous liquid ammonia in the usual manner.

The arrangement of the valve mechanism controlling the flow of anhydrous liquid ammonia to the shell 1 is such that the several parts such as the strainer 23, the float control valve 26 and back pressure valve 38 may be removed for inspection or repair without stopping the operation of the cooling apparatus as a whole. In the ordinary use of the apparatus, with all of the parts in position, as indicated in Figure 1, the ammonia liquid will flow through the pipe 13, valve 14, T-fitting 15, valve 24, pipe 25, float valve 26 and valve 27 and pipe 22 to the shell 1; and, the ammonia gas will be removed through pipe 35 and mechanism connected thereto.

One side of the chamber 10 is provided with an inlet 41 arranged so that the water or other liquid under pressure strikes against a baffle plate 42, which deflects liquid around the ferrules 11 and the air flue 12. Each of the ferrules 11 is provided with one or more slots 43 formed by bending inwardly a part, or parts, of the periphery of the ferrules 11. The object of this particular formation of the slots 43 and the provision of the baffle plate 42 is to impart a sort of whirling motion to the liquid as it passes through the ferrules so that it falls substantially as a hollow liquid cylinder in contact with the cooling contact surfaces of the tubes 7. By forming the column of water in this manner, practically all of the water is subjected to direct contact with the entire inner surface area of the cooling tubes 7. It will be obvious that the water falling in this manner becomes cooled very rapidly and is practically unimpeded in its fall.

The upper ends of the ferrules terminate at about the same level in the chamber 10 and form an overflow to take care of any volume of water in excess of the capacity of the slots 43. The ferrules 11 may be replaced by ferrules 11' similar in every respect to the ferrules 11, except that the upper edge of the ferrules 11' is provided with a series of notches to graduate the downward flow of liquid as it rises in the chamber 10.

Where the coolers are of great capacity, and consequently of correspondingly large diameter, the chamber 10 is provided with a water deflecting ring 44 suitably secured to the top 45 of the chamber 10. The lower edge 46 of the ring 44 is spaced above the tube sheet or header 2 so that the water when it comes in through the inlet 41 flows around the annular space and rises underneath the water deflecting ring. This arrangement causes the level of the water to rise uniformly around the water distributing ferrules 11 so that each of these tubes or ferrules will receive its proportionate amount of water or other liquid to be cooled. Where the diameter of the cooler is relatively small, and the number of tubes relatively small, the water deflecting ring 44 is not necessary; the water deflecting plate 10 then being sufficient to cause uniform rise of water around the ferrules. When the deflecting ring 44 is used, the water deflecting plate may or may not be used as desired.

While I have described the apparatus as using 15 liquid ammonia as a refrigerant, it is to be understood that carbon dioxide or any other equivalent refrigerant may be used for this purpose.

It is thought that the invention and numerous of its attendant advantages will be understood 20 from the foregoing description and it is obvious that numerous changes may be made in the form, construction and arrangement of the several parts without departing from the spirit or scope of my invention, or sacrificing any of its attendant advantages; 25 the form herein described being a preferred embodiment for the purpose of illustrating my invention.

What I claim is:

1. Liquid cooling apparatus comprising a heat 30 exchanger having a plurality of substantially vertical tubular passages therethrough, means for feeding liquid to flow by gravity along the surfaces of said passages, means for introducing into and maintaining in said exchanger a substantially 35 constant amount of liquid refrigerant to cool said passages, means for withdrawing the refrigerant in gaseous form from the exchanger, and means for causing air entrained by said liquid to separate from the cooled liquid and return 40 to said feeding means for recirculation through said tubular passageway.

2. Liquid cooling apparatus comprising a substantially vertical shell, headers closing the opposite ends of the shell, open ended tubes supported 45 substantially vertically within said shell by said headers, a liquid refrigerant partly filling said shell around said tubes, means for maintaining the refrigerant at constant level in said shell, mechanism controlled by said means for 50 supplying liquid refrigerant to said shell, means for feeding liquid to flow by gravity in contact with the inner surfaces of said tubes, and an air flue extending through said headers and above the upper ends of said tubes.

3. Liquid cooling apparatus comprising a substantially vertical shell, headers closing the opposite ends of the shell, open ended tubes supported substantially vertically within said shell by said headers, a liquid refrigerant partly filling said shell around said tubes, means for maintaining the refrigerant at constant level in said shell, mechanism controlled by said means for supplying liquid refrigerant to said shell, a casing extending above the upper header, means for feeding a liquid to said casing, means in said casing for directing the liquid to flow in contact with the inner surfaces of said tubes, and an air flue extending through said headers with its upper end above the upper ends of said tubes to effect circulation of air through said tubes.

4. Liquid cooling apparatus comprising a substantially vertical shell, headers closing the opposite ends of the shell, open ended tubes supported substantially vertically within said shell by said headers, a liquid refrigerant partly filling said shell around said tubes, means for maintaining the refrigerant at constant level in said shell, mechanism controlled by said means for supplying liquid refrigerant to said shell, a casing extending above the upper header, ferrules extending from said tubes within said casing, means for feeding liquid to said casing around said ferrules, said ferrules being provided with slots for directing the liquid as films to contact with the inner cooling surfaces of said tubes, and an air flue extending through said headers with its upper end above the upper ends of said tubes to effect circulation of air through said tubes.

5. The method of cooling a liquid which consists in causing the liquid to flow from a source of liquid supply in one direction as a cylindrical film through and in contact with a vertical cylindrical cooling surface, separating from said film the air entrained thereby during its passage along said surface, and returning the cooled air thus separated from the cooled film to the source of liquid supply.

BENJAMIN F. KUBAUGH.